(12) United States Patent
Seo

(10) Patent No.: US 9,897,031 B2
(45) Date of Patent: Feb. 20, 2018

(54) METHOD OF CONTROLLING OPERATION OF SWIRL CONTROL VALVE FOR DIESEL ENGINE

(71) Applicants: Hyundai Motor Company, Seoul (KR); Kia Motors Corporation, Seoul (KR)

(72) Inventor: Moo Seock Seo, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 142 days.

(21) Appl. No.: 14/955,861

(22) Filed: Dec. 1, 2015

(65) Prior Publication Data

US 2016/0265470 A1   Sep. 15, 2016

(30) Foreign Application Priority Data

Mar. 10, 2015  (KR) .................. 10-2015-00032957

(51) Int. Cl.
| | |
|---|---|
| *F02M 51/00* | (2006.01) |
| *F02D 41/26* | (2006.01) |
| *F02D 41/00* | (2006.01) |
| *F02B 31/06* | (2006.01) |
| *F02D 41/20* | (2006.01) |

(52) U.S. Cl.
CPC ............ *F02D 41/263* (2013.01); *F02B 31/06* (2013.01); *F02D 41/0002* (2013.01); *F02D 2041/0015* (2013.01); *F02D 2041/2065* (2013.01); *Y02T 10/146* (2013.01); *Y02T 10/42* (2013.01)

(58) Field of Classification Search
CPC ....... F02D 41/20; F02D 41/40; F02D 41/0087
USPC ................. 123/480, 481, 436, 299
See application file for complete search history.

(56) References Cited

U.S. PATENT DOCUMENTS

| 7,165,399 | B2 | 1/2007 | Stewart | |
|---|---|---|---|---|
| 7,275,374 | B2 | 10/2007 | Stewart et al. | |
| 2003/0233997 | A1* | 12/2003 | Kawaguchi | F02D 41/0085 |
| | | | | 123/299 |
| 2004/0099248 | A1* | 5/2004 | Ito | F02D 35/025 |
| | | | | 123/457 |
| 2004/0206070 | A1* | 10/2004 | Shirakawa | F01N 3/0814 |
| | | | | 60/285 |

(Continued)

FOREIGN PATENT DOCUMENTS

| JP | 2002-308134 A | 10/2002 |
|---|---|---|
| JP | 2007-291990 A | 11/2007 |

(Continued)

*Primary Examiner* — John Kwon
(74) *Attorney, Agent, or Firm* — Brinks Gilson & Lione

(57) ABSTRACT

The present disclosure is a method of controlling an operation of a swirl control valve for a diesel engine, which predicts an internal temperature of a swirl control valve for a diesel engine, and limit a motor duty ratio of the swirl control valve based on the predicted temperature. In particular, the method predicts an internal temperature (a temperature of a motor coil) of a swirl control valve in real time through modelling, and controls a motor duty ratio of the swirl control valve, so that the internal temperature does not reach a maximum coil temperature, at which the swirl control valve is damaged and/or is irresistible, based on the predicted temperature.

4 Claims, 2 Drawing Sheets

(56) References Cited

U.S. PATENT DOCUMENTS

Figure 1:
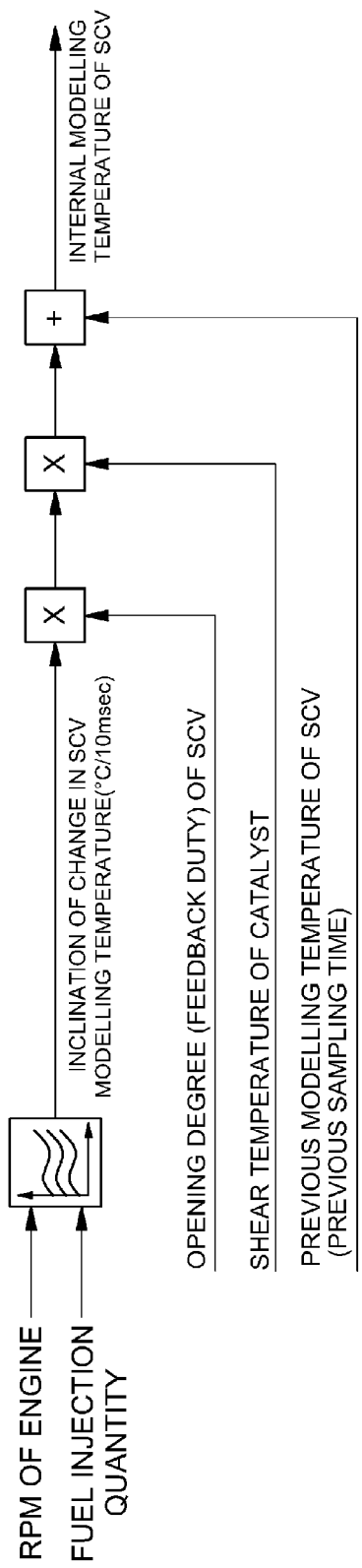

| | | | |
|---|---|---|---|
| 2005/0092303 A1* | 5/2005 | Oki | F02D 41/0087 123/480 |
| 2008/0120963 A1* | 5/2008 | Morita | F01N 3/0871 60/276 |
| 2009/0007564 A1* | 1/2009 | Suzuki | F02B 37/18 60/602 |
| 2009/0007888 A1* | 1/2009 | Sarlashkar | F02D 35/026 123/478 |

FOREIGN PATENT DOCUMENTS

| | | |
|---|---|---|
| JP | 4380765 B2 | 10/2009 |
| KR | 10-2003-0023013 A | 3/2003 |
| KR | 10-2005-0070259 A | 7/2005 |
| KR | 10-2012-0063150 A | 6/2012 |

\* cited by examiner

METHOD OF CONTROLLING OPERATION OF SWIRL CONTROL VALVE FOR DIESEL ENGINE

CROSS-REFERENCE TO RELATED APPLICATION

This application claims the benefit of Korean Patent Application No. 10-2015-0032957, filed on Mar. 10, 2015, which is hereby incorporated by reference in its entirety.

FIELD

The present disclosure relates to a method of controlling an operation of a swirl control valve for a diesel engine.

BACKGROUND

The statements in this section merely provide background information related to the present disclosure and may not constitute prior art.

In general, a diesel engine performs a swirl control on intake air by mounting a swirl control valve (SCV) in a passage of intake air flowing into a combustion chamber in order to more completely combust the intake air.

According to the swirl control, swirl is generated when intake air passes the SCV, and intake air, in which the swirl is generated, is supplied to the combustion chamber and well mixed with diesel fuel, so that it is possible to improve combustion efficiency, reduce exhaust gas, reduce particulate matters (PM), and the like.

A variable control method through a motor is mainly used as the method of controlling an operation of the SCV. An opening degree of the SCV may be freely controlled according to an engine operation region through a link unit connected with the motor.

For example, it is necessary to precisely control opening/closing of the SCV, such as closing the SCV in order to reduce exhaust gas in a middle/low load operation region of the engine, and opening the SCV so as to supply the large amount of intake air to the combustion chamber and improve output performance of the engine in a high load region.

However, the SCV of the diesel engine is not a component which is capable of always using a desired maximum current, because a coil temperature of the motor increases according to a use current and a use time of the motor of the SCV, and a surrounding temperature, and a coil resistant temperature is 180° C.

According to a characteristic of the SCV, a maximum motor duty (100%) may be used for three seconds, but it is recommended to use a limited, actual use, motor duty in consideration of preventing an excessive increase in a coil temperature.

TABLE 1

| | | SCV motor(limit 180° C.) | | |
|---|---|---|---|---|
| item | current(A) | −40° C. | RT | 130° C. |
| 1 | 0.5 | | | stable at about 151° C. |
| 2 | 1.0 | | | 4.6 minutes to 180° C. |
| 3 | 1.5 | | | 61 seconds to 180° C. |
| 4 | 2.0 | | | 21 seconds to 180° C. |
| 5 | 2.5 | | | 11.5 seconds to 180° C. |
| 6 | 3.0 | 75 seconds to 180° C. | 41 seconds to 180° C. | 6 seconds to 180° C. |

Table 1 is an experimental result representing our discoveries, and shows a time taken for increasing a coil temperature to 180° C. when a motor for operating the SCV is driven with a predetermined current, and it can be seen that when a current is continuously applied with 1.0 A, a use time limit of the SCV needs to be 4.6 minutes, and as a driving current is increased, a use permitted time is decreased.

TABLE 2

| | SCV motor(limit 180° C.) | |
|---|---|---|
| item | current(A) | chamber temperature 130° C. |
| 1 | 0.5 | stable at 151.1° C. |
| 2 | 0.6 | stable at 161° C. |
| 3 | 0.7 | stable at 173.6° C. |
| 4 | 0.8 | >180° C. |

Table 2 is an experimental result representing our discoveries, and was obtained by measuring a driving current limit value according to a temperature for preventing the SCV from being damaged, and it can be seen that when the motor is driven with 0.7 A, the motor is stable at 173.6° C., and when a driving current is increased to 0.8 A, the chamber temperature exceeds 180° C., which is a coil temperature, at which the SCV is resistible, and it can be seen through the experiment that in order to prevent the SCV from being damaged, a driving current of the motor of the SCV limited by an electronic control unit (ECU) controlling an operation of the SCV is 0.7 A.

The ECU commands a motor duty to the motor for operating the SCV through a pulse width modulation (PWM) communication, and our discoveries from an experimental result for a motor duty limit value of the ECU for limiting the driving current to 0.7 A is represented in Table 3 below.

TABLE 3

| | | SCV motor (limit 180° C.) | | | | | | | |
|---|---|---|---|---|---|---|---|---|---|
| | Motor duty | 5% | 10% | 15% | 20% | 25% | 30% | 35% | 40% |
| 1 | Room temperature | 0.179 | 0.310 | 0.462 | 0.641 | 0.784 | 0.951 | 1.123 | 1.261 |
| | 130° C. | 0.170 | 0.320 | 0.441 | 0.551 | 0.667 | 0.805 | 0.928 | 1.034 |
| 2 | Room temperature | 0.196 | 0.327 | 0.491 | 0.669 | 0.817 | 0.977 | 1.146 | 1.303 |
| | High temperature | 0.177 | 0.298 | 0.464 | 0.539 | 0.768 | 0.800 | 0.934 | 1.069 |
| 3 | Room temperature | 0.201 | 0.327 | 0.487 | 0.649 | 0.808 | 0.969 | 1.120 | 1.274 |
| | High temperature | 0.164 | 0.277 | 0.444 | 0.531 | 0.647 | 0.780. | 0.907 | 1.033 |
| 4 | Room temperature | 0.150 | 0.287 | 0.446 | 0.622 | 0.817 | 0.934 | 1.099 | 1.262 |
| | High temperature | 0.146 | 0.290 | 0.387 | 0.522 | 0.632 | 0.767 | 0.950 | 1.173 |
| 5 | Room temperature | 0.117 | 0.250 | 0.467 | 0.590 | 0.729 | 1.028 | 1.231 | 1.397 |
| | High temperature | 0.144 | 0.260 | 0.380 | 0.522 | 0.649 | 0.776 | 0.897 | 1.020 |

We have discovered that, and as can be seen in Table 3, when the ECU applies the motor duty of 25%, a current output value for the motor is different according to a surrounding temperature (for example, a motor coil temperature) of the SCV.

For example, when the ECU applies the motor duty of 25%, a current output value is 0.784 A at a room temperature, but the current output value is decreased to 0.667 A at a high and bad temperature condition of 130° C.

That is, it can be seen that when a temperature is increased, an output current with respect to the same duty is decreased, and a duty limit value of the ECU needs to be further decreased at a high temperature.

Accordingly, the ECU needs to consider a bad condition in setting a motor duty limit value of the SCV, so that finally, in order to limit the output current to 0.7 A, the duty needs to be limited to 25%.

However, when a motor-providing company limits the motor duty to 25% in order to protect the motor of the SCV, there is a problem in that engine developers cannot calibrate a motor duty by a desired level.

Realistically, when a motor duty limit value of 25% is applied to an actual vehicle, there is a problem in that an operation response of the SCV is late due to a lack of proportional integral and derivative (PID) gain according to a lack of duty, and a side effect, such as an error generation of a large deviation between a target duty and an actual duty, is generated.

SUMMARY

The present disclosure provides a method of controlling an operation of a swirl control valve for a diesel engine, which predicts an internal temperature (a temperature of a motor coil) of a swirl control valve in real time through modelling, and controls a motor duty ratio of the swirl control valve, so that the internal temperature does not reach a maximum coil temperature at which the swirl control valve is damaged and is resistible, based on the predicted temperature. The method limits a duty for protecting a SVC motor while also securing a minimum duty for developing an engine.

In one aspect, the present disclosure provides a method of controlling an operation of a swirl control valve for a diesel engine, including the following steps: i) selecting a factor determining a change in an internal temperature of a swirl control valve as a factor for modelling an internal temperature of the swirl control valve; ii) modelling and predicting a current internal temperature of the swirl control valve by using the selected factor; and iii) controlling a motor duty ratio for operating the swirl control valve by using the modelled current internal temperature of the swirl control valve.

In one embodiment, the factor for modelling the internal temperature of the swirl control valve may include a fuel injection quantity, revolutions per minute (RPM) of an engine, an opening degree of the swirl control valve, or a shear temperature of a catalyst mounted in an exhaust line.

In another embodiment, in the modeling and predicting step (i.e., the step (ii)), the current internal temperature of the swirl control valve may be calculated by: making a change in an internal temperature of the swirl control valve according to an increase/decrease change amount of a fuel injection quantity and an RPM of an engine among the factors for modelling the internal temperature of the swirl control valve as map data; extracting a change amount of internal temperature of the swirl control valve corresponding to a current fuel injection quantity and an RPM of the engine from the map data; and sequentially multiplying the extracted change amount of the internal temperature of the swirl control valve by a current opening degree of the swirl control valve and a shear temperature of a catalyst, and then adding a previous internal modelling temperature of the swirl control valve to a value obtained by multiplying the extracted change amount of the internal temperature of the swirl control valve, the current opening degree of the swirl control valve, and the shear temperature of the catalyst.

The controlling step (i.e., step (iii)) of the motor duty ratio may include: when the current internal modelling temperature of the swirl control valve obtained in the step (ii) (i.e., the step of modelling and predicting the current internal temperature of the swirl control valve) exceeds a first reference value, decreasing a motor duty ratio of the swirl control valve commanded by an electronic control unit, in such a manner that a duty decreasing factor by the current internal modelling temperature of the swirl control valve is multiplied, so that the motor duty ratio is decreased; and when the current internal modelling temperature of the swirl control valve obtained in the step (ii) exceeds a second reference value larger than the first reference value, controlling, by the electronic control unit, the motor duty ratio of the swirl control valve to zero (0).

Through the aforementioned technical solutions, the present disclosure provides the effects below.

First, it is possible to predict an internal temperature (a temperature of a motor coil) of a swirl control valve through modelling using a fuel injection quantity, an RPM of an engine, and the like, as factors in real time, and control a motor duty ratio of the swirl control valve at a level of inhibiting or preventing the swirl control valve from being damaged based on the predicted temperature.

Second, it is possible to easily calibrate a motor duty ratio for opening/closing the swirl control valve to a target level for developing an engine and a level for protecting a motor through modelling of an internal temperature of the swirl control valve.

Third, it is possible to limit a duty of the motor and a current for protecting the swirl control valve, thereby decreasing complaints according to breakage of the swirl control valve.

Fourth, it is possible to model an internal temperature of the swirl control valve without a separate internal temperature sensor, thereby promoting reduction of manufacturing costs, compared to a case where a temperature sensor is applied.

Other aspects and embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

Figure 2:
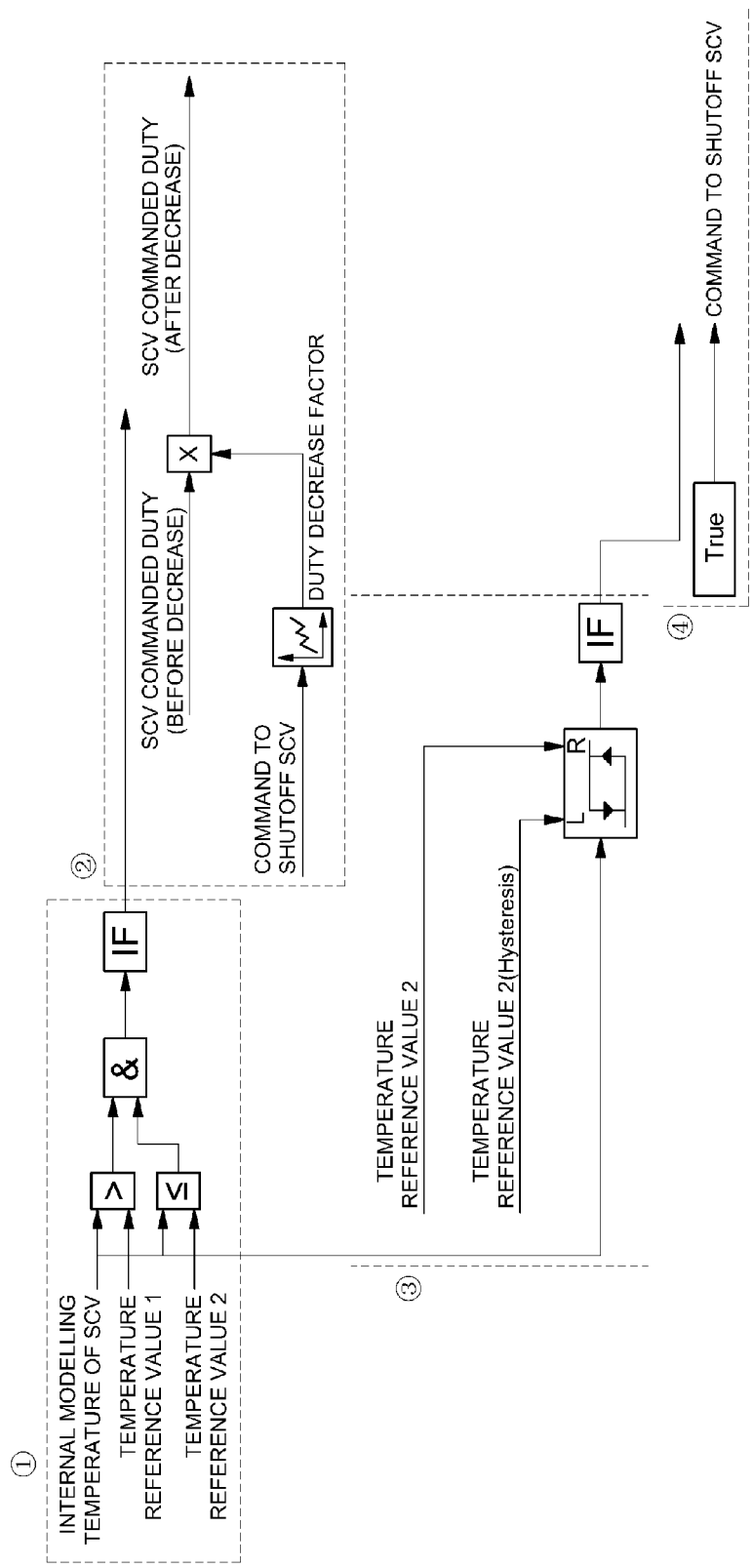

In order that the disclosure may be well understood, there will now be described various forms thereof, given by way of example, reference being made to the accompanying drawings, in which:

FIG. 1 is a control diagram illustrating prediction of an internal temperature of a swirl control valve through modeling according to the present disclosure; and FIG. 2 is a control diagram illustrating a logic limiting a motor duty ratio after modeling an internal temperature of the swirl control valve according to the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is intended to cover not only the exemplary embodiments, but also various alternatives, modifications, equivalents and other embodiments, which may be included within the spirit and scope of the present disclosure as defined by the appended claims.

As described above, an opening/closing degree of a swirl control valve may be freely controlled through a link unit connected with a motor according to an engine operating region, and finally, an opening/closing operation of the swirl control valve is performed through a duty control for driving the motor by an electronic control unit (ECU).

In general, a representative method of controlling driving of the motor is a pulse width modulation (PWM) method, and the PWM method is a method of varying a width of a driving pulse in accordance with a rotation speed of the motor, and the width of the driving pulse is varied by a duty ratio control.

For reference, the motor duty ratio is defined by a ratio of a pulse "on" section in one period of a pulse, and for example, a duty ratio at 100% means that one period of a pulse is continuously maintained in an "on" state, and a duty ratio at 50% means that a half of one period of a pulse is maintained in an "on" state, and the remaining half of one period of a pulse is maintained in an "off" state.

Accordingly, revolutions per minute (RPM) and a torque of the motor are controlled according to the motor duty ratio.

The present disclosure focuses a point that a motor duty may be calibrated by a level desired by engine developers in setting a motor duty limit value of the swirl control valve, in contrast to the related art, in which a motor duty ratio is limited for protecting a motor.

That is, the present disclosure focuses a point that considering a fact that a current output value for a motor is changed according to a surrounding temperature (for example, a motor coil temperature) of the switch control value, when an ECU applies a predetermined ratio of motor duty, an internal temperature (a temperature for a motor coil) of the swirl control valve is predicted in real time through modeling, and a motor duty ratio of the swirl control valve is calibrated, so that the internal temperature does not reach a maximum temperature of a motor coil (about 180° C. as a coil resistible temperature), at which the swirl control valve can be damaged and/or is irresistible, based on the predicted temperature.

FIG. 1 is a control diagram illustrating prediction of an internal temperature of a swirl control valve through modeling according to the present disclosure.

First, a fuel injection quantity for an engine, an RPM of the engine, an opening degree of the swirl control valve, a shear temperature of a catalyst mounted in an exhaust line, and the like are selected as factors for predicting an internal temperature (a temperature of a motor coil) of the swirl control valve through modeling.

The fuel injection quantity is selected as one factor for determining a temperature of a combustion chamber, an exhaust temperature, an internal temperature of the swirl control valve, which have a proportional relation with the fuel injection quantity.

For example, when the fuel injection quantity is increased, a temperature of the combustion chamber and an exhaust temperature are increased, and the swirl control valve needs to be further opened in order to supply more air to the combustion chamber, and accordingly, a motor duty ratio for operating the swirl control valve is further increased, so that a temperature of the motor coil is also increased.

Accordingly, the fuel injection quantity may also be a factor for determining a temperature of the combustion chamber, an exhaust temperature, and an internal temperature of the swirl control valve.

The RPM of the engine is selected as one factor for determining a temperature of a combustion chamber, an exhaust temperature, an internal temperature of the swirl control valve, which have a proportional relation with the RPM of the engine.

For example, when the RPM of the engine is increased, a temperature of the combustion chamber and an exhaust temperature are increased according to an increase in an output of the engine, and the swirl control valve needs to be further opened in order to supply more air to the combustion chamber, and accordingly, a motor duty ratio for operating the swirl control valve is further increased, so that a temperature of the motor coil is also increased.

Accordingly, the RPM of the engine may be a factor for determining a temperature of the combustion chamber, an exhaust temperature, and an internal temperature of the swirl control valve.

A change in an internal temperature (for example, a temperature of the motor coil) of the swirl control valve according to an increase/decrease change amount of the selected fuel injection quantity and RPM of the engine is obtained through an experiment, and is map-databased.

For example, a change amount of the internal temperature of the swirl control valve extracted according to the increase/decrease change amount of the fuel injection quantity and the RPM of the engine from the map data is modelled in an inclination changed with a predetermined temperature for every 10 msec.

Accordingly, the ECU for controlling a motor duty may easily extract a change amount of the internal temperature of the swirl control valve according to the increase/decrease change amount of the fuel injection quantity and the RPM of the engine from the map data.

In the meantime, a passage flow rate of intake air passing through the swirl control valve and supplied to the combustion chamber and an internal temperature of the swirl control valve also have a proportional relation with each other.

That is, when a passage flow rate of intake air is large, an opening degree of the swirl control valve is increased, and finally the internal temperature of the swirl control valve is increased to an internal temperature (for example, the temperature of the motor coil) for maintaining an opening operation of the swirl control valve, so that a passage flow rate of intake air and an internal temperature of the swirl control valve also have a proportional relation with each other.

Accordingly, the opening degree of the swirl control valve is selected as a factor for predicting an internal temperature (a temperature of the motor coil) of the swirl control valve through modelling, in addition to the fuel injection quantity and the RPM of the engine.

Accordingly, a change amount of the internal temperature of the swirl control valve is extracted from the map data, and then the extracted change amount of internal temperature is multiplied by a current opening degree of the swirl control valve.

The internal temperature of the swirl control valve has a proportional relation with exhaust temperature, which is increased according to an increase in an engine output and an increase in a temperature of the combustion chamber.

That is, the increase of the exhaust temperature according to an increase in an engine output and an increase in a temperature of the combustion chamber means a state where an opening degree of the swirl control valve is increased in order to supply more exhaust air to the combustion chamber, so that an internal temperature (for example, a temperature of the motor coil) and an exhaust temperature for maintaining an opening operation of the swirl control valve have a proportional relation with each other.

Accordingly, a shear temperature of the catalyst capable of measuring an exhaust temperature is selected as a factor for predicting an internal temperature (a temperature of the motor coil) of the swirl control valve through modelling, in addition to the fuel injection quantity, the RPM of the engine, and an opening degree of the swirl control valve.

Accordingly, a current fuel injection quantity and a change amount of an internal temperature of the swirl control valve corresponding to an RPM of the engine are extracted from the map data, the extracted change amount of internal temperature is multiplied by a current opening degree of the swirl control valve, and then a shear temperature of the catalyst is further multiplied.

Next, a value obtained by multiplying the change amount of the internal temperature of the swirl control valve, the current opening degree of the swirl control valve, and the shear temperature of the catalyst extracted from the map data as described above, that is, a final change amount of internal temperature of the swirl control valve, is added to a previous internal modelling temperature of the swirl control valve, so that a current internal modelling temperature of the swirl control valve indicating a current internal temperature of the swirl control valve is obtained.

The internal modelling temperature of the swirl control valve obtained as described above is used for a motor duty ratio control logic for operating the swirl control valve.

FIG. 2 is a control diagram illustrating a logic limiting a motor duty ratio after modeling an internal temperature of the swirl control valve according to the present disclosure.

The motor duty ratio limit logic using the internal modelling temperature of the swirl control valve is generally divided into two parts and performed.

First, when the current internal modelling temperature of the swirl control valve obtained as described above exceeds a first reference value of the temperature of the motor coil (for example, a value set to a temperature less than 180° C., at which the swirl control valve is concerned to be damaged), the swirl control valve is in a state of a low danger, but the internal temperature of the swirl control valve may be managed with the first reference value or lower, so that a control for decreasing a motor duty ratio of the swirl control valve commanded by the ECU is performed.

Accordingly, the ECU multiplies a duty decreasing factor by the current internal modelling temperature of the swirl control valve, and then outputs a decreased commanded duty of the swirl control valve, that is, a decreased motor duty ratio, so that the ECU may calibrate a motor duty ratio of the swirl control valve to a range, in which the internal temperature of the swirl control valve does not reach a maximum temperature of the motor coil (about 180° C., at which the swirl control valve is damaged and/or is irresistible).

When the current internal modelling temperature of the swirl control valve obtained as described above exceeds a second reference value (for example, a value set to a temperature close to 180° C. which is the temperature of the motor coil, at which there is concern that the swirl control valve can be damaged), the ECU determines that the swirl control valve is at a danger level, in which damage to the swirl control valve according to breakage of the motor is concerned, so that the ECU unconditionally shuts off the operation itself of the swirl control valve by controlling the motor duty ratio of the swirl control valve to zero (0), thereby protecting the swirl control valve from being damaged.

Accordingly, it is possible to easily calibrate a motor duty ratio for opening/closing the swirl control valve to a level for development of an engine and protection of a motor through modelling of an internal temperature of the swirl control valve.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A method of controlling an operation of a swirl control valve for a diesel engine, comprising the following steps:
    selecting at least one factor determining a change in an internal temperature of a swirl control valve as a factor for modelling an internal temperature of the swirl control valve;
    modelling and predicting a current internal temperature of the swirl control valve by using said at least one factor selected; and
    controlling a motor duty ratio for operating the swirl control valve by using the modelled and predicted current internal temperature of the swirl control valve;
    wherein the modeling and predicting step comprises:
    making a change in an internal temperature of the swirl control valve according to an increase/decrease of a fuel injection quantity and revolutions per minute (RPM) of an engine among the factors for modelling the internal temperature of the swirl control valve as map data;
    extracting a change of the internal temperature of the swirl control valve corresponding to a current fuel injection quantity and an RPM of the engine from the map data; and
    sequentially multiplying the extracted change of the internal temperature of the swirl control valve by a current opening degree of the swirl control valve and a shear temperature of a catalyst, and then adding the previously modelled and predicted current internal temperature of the swirl control valve to a value obtained by multiplying the extracted change of the internal temperature of the swirl control valve, the current opening degree of the swirl control valve, and the shear temperature of the catalyst.

2. The method according to claim 1, wherein the at least one factor for modelling the internal temperature of the swirl control valve comprises a fuel injection quantity, revolutions per minute (RPM) of an engine, an opening degree of the swirl control valve, and a shear temperature of a catalyst mounted in an exhaust line.

3. The method according to claim 1, wherein the controlling step comprises:
    when the current internal modelling temperature of the swirl control valve obtained in the modelling and predicting step exceeds a first reference value, decreasing a motor duty ratio of the swirl control valve commanded by an electronic control unit; and
    when the current internal modelling temperature of the swirl control valve obtained in the modelling and predicting step exceeds a second reference value larger than the first reference value, controlling, by the electronic control unit, the motor duty ratio of the swirl control valve to zero (0).

4. The method according to claim 3, wherein the controlling of the motor duty ratio of the swirl control valve is performed by multiplying, by the electronic control unit, a duty decreasing factor by the previously modelled and predicted current internal temperature of the swirl control valve, and outputting the decreased motor duty ratio.

* * * * *